US012621033B2

(12) United States Patent (10) Patent No.: US 12,621,033 B2
Sung (45) Date of Patent: May 5, 2026

(54) POWER SAVING MODE COVERAGE CONTROL

(71) Applicant: T-Mobile Innovations LLC, Overland Park, KS (US)

(72) Inventor: Sanghoon Sung, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 321 days.

(21) Appl. No.: 18/461,620

(22) Filed: Sep. 6, 2023

(65) Prior Publication Data

US 2025/0080196 A1    Mar. 6, 2025

(51) Int. Cl.
*H04B 7/06* (2006.01)
*H04B 7/0413* (2017.01)

(52) U.S. Cl.
CPC ......... *H04B 7/0693* (2013.01); *H04B 7/0413* (2013.01)

(58) Field of Classification Search
CPC .. H04B 7/0693; H04B 7/0413; H04B 7/0452; H04B 7/0691
USPC ........................................... 455/101, 91, 103
See application file for complete search history.

(56) References Cited

U.S. PATENT DOCUMENTS

| 10,044,426 | B1 * | 8/2018 | Pawar .................. H04B 7/0452 |
| 10,568,027 | B2 | 2/2020 | Yang et al. |
| 10,624,035 | B1 * | 4/2020 | Pawar ................. H04W 52/146 |
| 10,797,762 | B1 * | 10/2020 | Sung .................... H04B 7/0617 |
| 11,153,821 | B2 | 10/2021 | Chen et al. |
| 11,234,245 | B1 * | 1/2022 | Sekar .................. H04W 72/541 |
| 2022/0295416 | A1 * | 9/2022 | Marupaduga ....... H04W 52/146 |
| 2023/0344483 | A1 * | 10/2023 | Akoum ................ H04B 7/0413 |
| 2024/0372595 | A1 * | 11/2024 | Mungara ............. H04B 7/0632 |

* cited by examiner

*Primary Examiner* — Juan A Torres
(74) *Attorney, Agent, or Firm* — Jones Burke PLLC

(57) ABSTRACT

In order to reduce power consumption, an access node may turn off transmissions from one or more rows or columns of antennas in a mMIMO array. To help prevent the beam from overshooting (i.e., going beyond) an intended area of coverage when the access node turns off transmission by one or more rows, the access node also increases the electrical down tilt of the beam (i.e., angle of depression) to help contain the beam within its intended area of coverage. To help prevent problems with SSB beam selection and/or beam switching, when the access node turns off transmission by one or more columns, the access node reduces the number of SSB beams that are transmitted while sweeping SSBs over the sector thereby reducing the overlap of the (now) wider SSB beams.

20 Claims, 12 Drawing Sheets

300

300

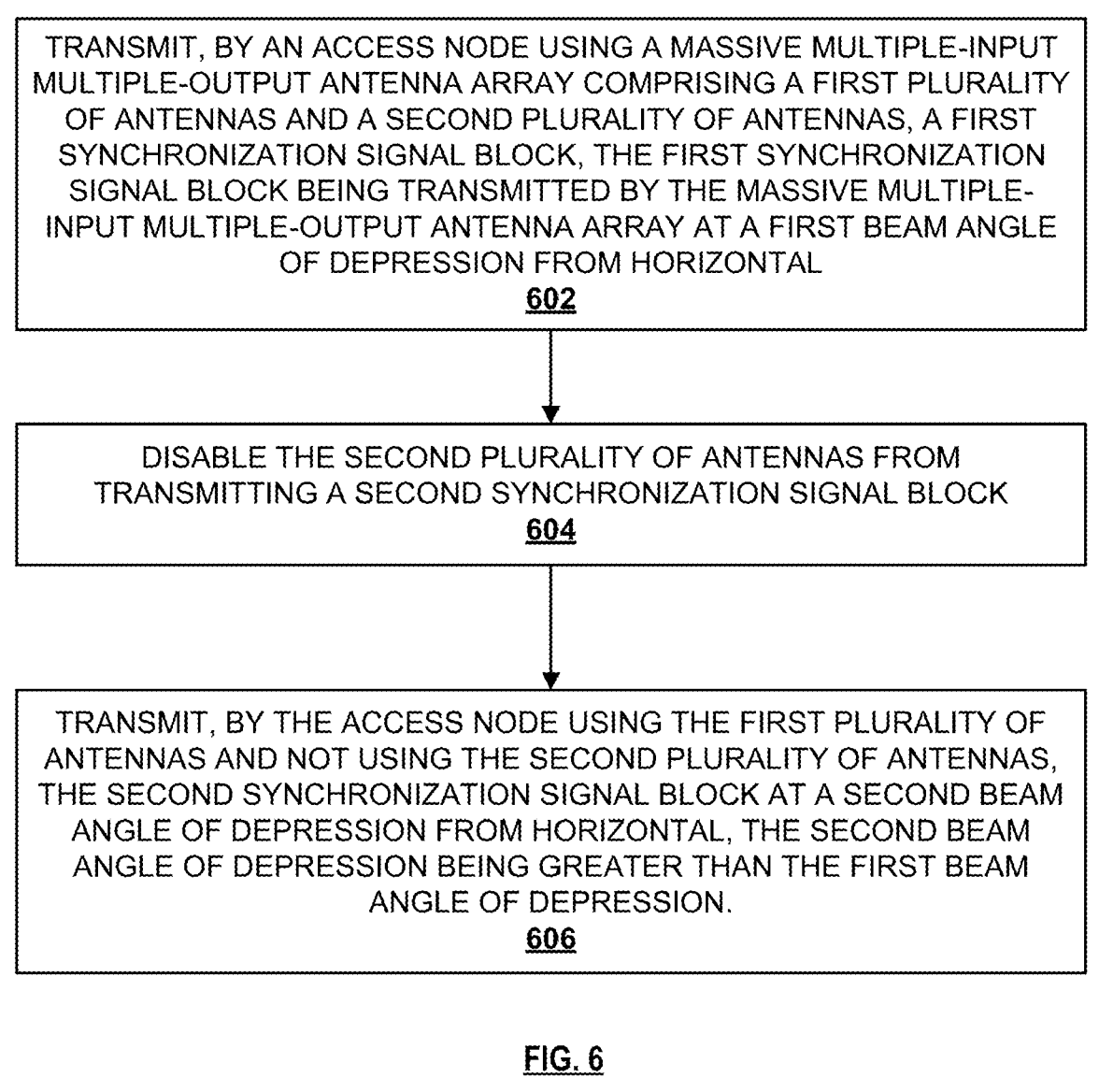

TRANSMIT, BY AN ACCESS NODE USING A MASSIVE MULTIPLE-INPUT MULTIPLE-OUTPUT ANTENNA ARRAY COMPRISING A FIRST PLURALITY OF ANTENNAS AND A SECOND PLURALITY OF ANTENNAS, A FIRST SYNCHRONIZATION SIGNAL BLOCK, THE FIRST SYNCHRONIZATION SIGNAL BLOCK BEING TRANSMITTED BY THE MASSIVE MULTIPLE-INPUT MULTIPLE-OUTPUT ANTENNA ARRAY AT A FIRST BEAM ANGLE OF DEPRESSION FROM HORIZONTAL
602

DISABLE THE SECOND PLURALITY OF ANTENNAS FROM TRANSMITTING A SECOND SYNCHRONIZATION SIGNAL BLOCK
604

TRANSMIT, BY THE ACCESS NODE USING THE FIRST PLURALITY OF ANTENNAS AND NOT USING THE SECOND PLURALITY OF ANTENNAS, THE SECOND SYNCHRONIZATION SIGNAL BLOCK AT A SECOND BEAM ANGLE OF DEPRESSION FROM HORIZONTAL, THE SECOND BEAM ANGLE OF DEPRESSION BEING GREATER THAN THE FIRST BEAM ANGLE OF DEPRESSION.
606

FIG. 6

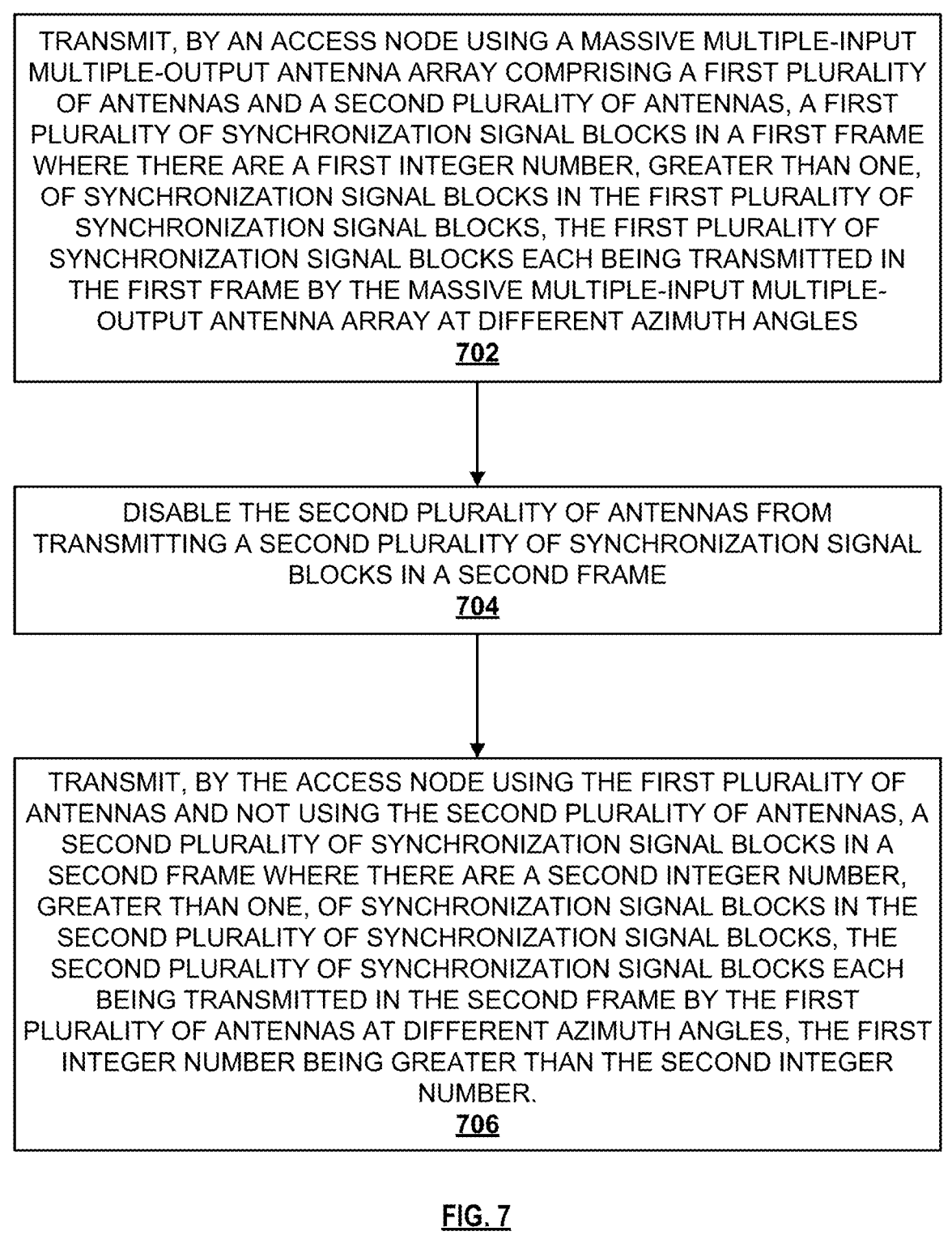

TRANSMIT, BY AN ACCESS NODE USING A MASSIVE MULTIPLE-INPUT MULTIPLE-OUTPUT ANTENNA ARRAY COMPRISING A FIRST PLURALITY OF ANTENNAS AND A SECOND PLURALITY OF ANTENNAS, A FIRST PLURALITY OF SYNCHRONIZATION SIGNAL BLOCKS IN A FIRST FRAME WHERE THERE ARE A FIRST INTEGER NUMBER, GREATER THAN ONE, OF SYNCHRONIZATION SIGNAL BLOCKS IN THE FIRST PLURALITY OF SYNCHRONIZATION SIGNAL BLOCKS, THE FIRST PLURALITY OF SYNCHRONIZATION SIGNAL BLOCKS EACH BEING TRANSMITTED IN THE FIRST FRAME BY THE MASSIVE MULTIPLE-INPUT MULTIPLE-OUTPUT ANTENNA ARRAY AT DIFFERENT AZIMUTH ANGLES
702

DISABLE THE SECOND PLURALITY OF ANTENNAS FROM TRANSMITTING A SECOND PLURALITY OF SYNCHRONIZATION SIGNAL BLOCKS IN A SECOND FRAME
704

TRANSMIT, BY THE ACCESS NODE USING THE FIRST PLURALITY OF ANTENNAS AND NOT USING THE SECOND PLURALITY OF ANTENNAS, A SECOND PLURALITY OF SYNCHRONIZATION SIGNAL BLOCKS IN A SECOND FRAME WHERE THERE ARE A SECOND INTEGER NUMBER, GREATER THAN ONE, OF SYNCHRONIZATION SIGNAL BLOCKS IN THE SECOND PLURALITY OF SYNCHRONIZATION SIGNAL BLOCKS, THE SECOND PLURALITY OF SYNCHRONIZATION SIGNAL BLOCKS EACH BEING TRANSMITTED IN THE SECOND FRAME BY THE FIRST PLURALITY OF ANTENNAS AT DIFFERENT AZIMUTH ANGLES, THE FIRST INTEGER NUMBER BEING GREATER THAN THE SECOND INTEGER NUMBER.
706

FIG. 7

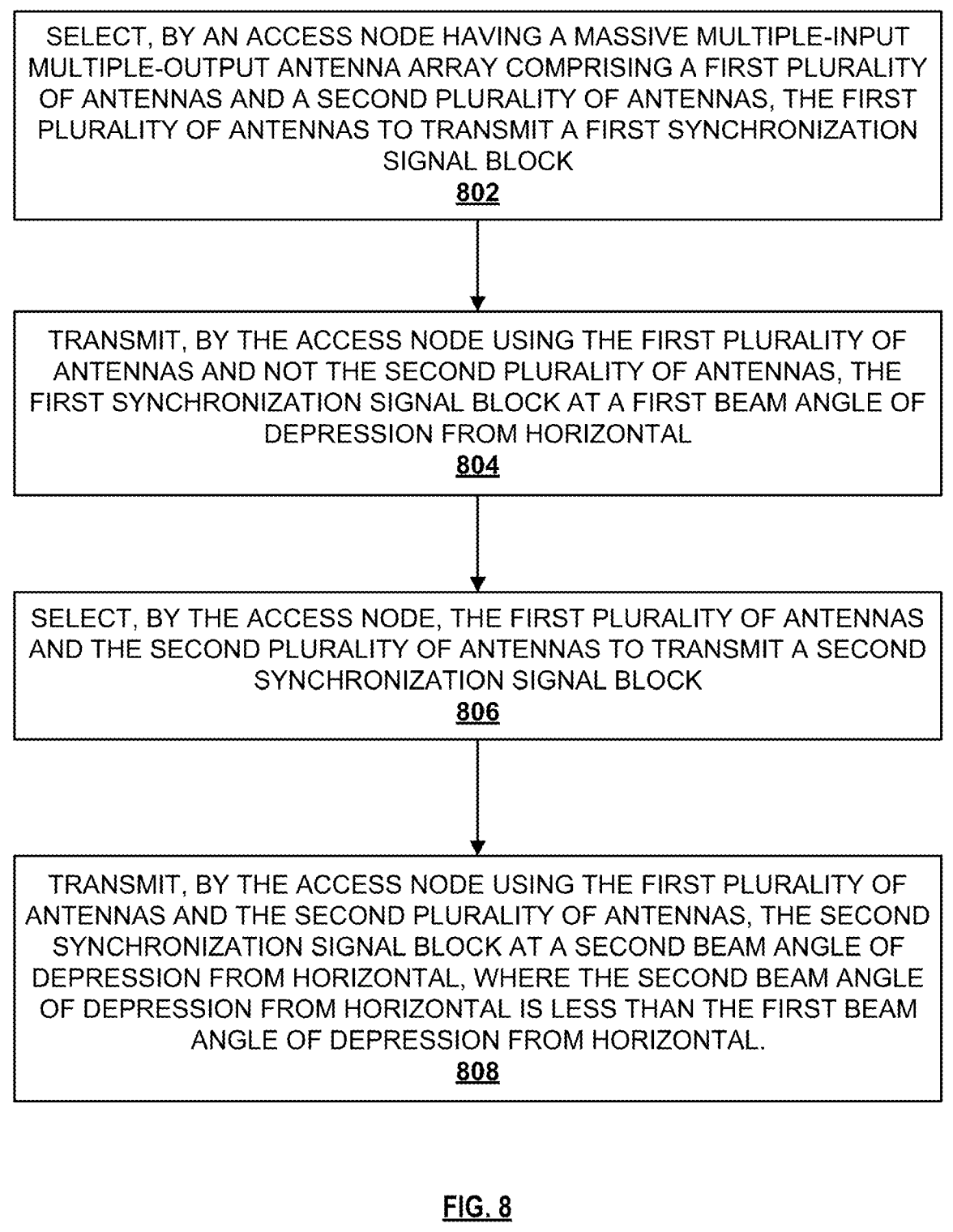

SELECT, BY AN ACCESS NODE HAVING A MASSIVE MULTIPLE-INPUT MULTIPLE-OUTPUT ANTENNA ARRAY COMPRISING A FIRST PLURALITY OF ANTENNAS AND A SECOND PLURALITY OF ANTENNAS, THE FIRST PLURALITY OF ANTENNAS TO TRANSMIT A FIRST SYNCHRONIZATION SIGNAL BLOCK
802

TRANSMIT, BY THE ACCESS NODE USING THE FIRST PLURALITY OF ANTENNAS AND NOT THE SECOND PLURALITY OF ANTENNAS, THE FIRST SYNCHRONIZATION SIGNAL BLOCK AT A FIRST BEAM ANGLE OF DEPRESSION FROM HORIZONTAL
804

SELECT, BY THE ACCESS NODE, THE FIRST PLURALITY OF ANTENNAS AND THE SECOND PLURALITY OF ANTENNAS TO TRANSMIT A SECOND SYNCHRONIZATION SIGNAL BLOCK
806

TRANSMIT, BY THE ACCESS NODE USING THE FIRST PLURALITY OF ANTENNAS AND THE SECOND PLURALITY OF ANTENNAS, THE SECOND SYNCHRONIZATION SIGNAL BLOCK AT A SECOND BEAM ANGLE OF DEPRESSION FROM HORIZONTAL, WHERE THE SECOND BEAM ANGLE OF DEPRESSION FROM HORIZONTAL IS LESS THAN THE FIRST BEAM ANGLE OF DEPRESSION FROM HORIZONTAL.
808

FIG. 8

POWER SAVING MODE COVERAGE CONTROL

TECHNICAL BACKGROUND

As wireless networks evolve and grow, there are ongoing challenges in providing high-quality service to increasing numbers of wireless devices in various coverage areas of a wireless network. Wireless networks may be configured to utilize massive multiple-input multiple-output (mMIMO), in which multiple data streams can be directed towards a plurality of wireless devices that are selected to participate in a MIMO operating mode based on the orthogonality of transmission, thereby maximizing resources. MIMO has been identified as one of the promising air interface technologies to address the capacity requirement required demanded by 5G networks, and increasingly access nodes with multiple antenna arrays are being deployed in wireless networks.

In order to save power consumption, mMIMO may dynamically activate and deactivate transmit antenna branches in order to save power. These antenna branches may be activated and/or deactivated when certain conditions are met. These conditions may include, for example, when the number of connected user equipment devices is below a threshold and/or during a defined period of time (e.g., between 1 a.m. and 4 a.m.). However, reducing the number of transmit antennas alters the radiation pattern of the mMIMO array such that a mMIMO array in power saving mode may interfere with other nearby cellular sites and/or sectors.

Overview

Examples described herein include systems, methods, wireless devices, access nodes, and non-transitory computer readable mediums for reducing interference in mMIMO networks. An exemplary method for reducing interference in mMIMO networks includes transmitting, by an access node using a massive multiple-input multiple-output antenna array comprising a first plurality of antennas and a second plurality of antennas, a first synchronization signal block, where the first synchronization signal block is transmitted by the massive multiple-input multiple-output antenna array at a first beam angle of depression from horizontal. The second plurality of antennas from transmitting a second synchronization signal block are then disabled. By the access node and using the first plurality of antennas and not using the second plurality of antennas, the second synchronization signal block is transmitted at a second beam angle of depression from horizontal, the second beam angle of depression being greater than the first beam angle of depression.

An additional example includes another method of reducing interference in mMIMO networks. This method of reducing interference in mMIMO networks includes transmitting, by an access node using a massive multiple-input multiple-output antenna array comprising a first plurality of antennas and a second plurality of antennas, a first plurality of synchronization signal blocks in a first frame where there are a first integer number, greater than one, of synchronization signal blocks in the first plurality of synchronization signal blocks. The first plurality of synchronization signal blocks each being transmitted in the first frame by the massive multiple-input multiple-output antenna array at different azimuth angles. The second plurality of antennas fare disabled from transmitting a second plurality of synchronization signal blocks in a second frame. By the access node using the first plurality of antennas and not using the second plurality of antennas, a second plurality of synchronization signal blocks are transmitted in a second frame where there are a second integer number, greater than one, of synchronization signal blocks in the second plurality of synchronization signal blocks and the second plurality of synchronization signal blocks each is transmitted in the second frame by the first plurality of antennas at different azimuth angles, where the first integer number being greater than the second integer number.

In yet a further example, a method of operating a communication system includes selecting, by an access node having a massive multiple-input multiple-output antenna array comprising a first plurality of antennas and a second plurality of antennas, the first plurality of antennas to transmit a first synchronization signal block. By the access node using the first plurality of antennas and not the second plurality of antennas, the first synchronization signal block is transmitted at a first beam angle of depression from horizontal. By the access node, the first plurality of antennas and the second plurality of antennas are selected to transmit a second synchronization signal block. By the access node using the first plurality of antennas and the second plurality of antennas, the second synchronization signal block is transmitted at a second beam angle of depression from horizontal, where the second beam angle of depression from horizontal is less than the first beam angle of depression from horizontal.

BRIEF DESCRIPTION OF THE DRAWINGS

FIG. 6 is a flowchart illustrating a method for reducing interference while in a power saving mode.

FIG. 7 is a flowchart illustrating a method for reducing interference.

FIG. 8 is a flowchart illustrating a method for changing power modes.

DETAILED DESCRIPTION

Examples described herein include systems, methods, wireless devices, and computer readable mediums for reducing interference in mMIMO networks by changing the beam angle of depression or reducing the number of synchronization signal block transmissions per sector. For example, in order to reduce power consumption, an access node may turn off transmissions from one or more rows of antennas in a mMIMO array. Reducing the number of rows that are used to form the beam increases the vertical dimension of the beam (i.e., the beam is less focused in the vertical plane). This may cause the beam to overshoot (i.e., go beyond) the intended area of coverage for the access node thereby interfering with a neighboring access node. To help prevent overshooting, when the access node turns off transmission by one or more rows, the access node also increases the electrical down tilt of the beam (i.e., angle of depression) to help contain the beam within its intended area of coverage.

The access node also measures the timing advance values used by user equipment (UE) devices attached or attempting to attach to the access node. Since the timing advance value is indicative of the distance between the access node and the user equipment, when the timing advance value for a UE is greater than a configured threshold, the access node may further increase the angle of depression to help ensure UE connections (and attempts) are substantially only being made by UE devices that are within the intended coverage area of the access node.

In another example, reducing the number of columns that are used to form the beam increases the horizontal dimension of the beam (i.e., the beam is less focused in the horizontal plane). This can cause the beam to overshoot into horizontally neighboring sectors. In addition, the wider beam increases the horizontal overlap of synchronization signal blocks (SSB) beam transmissions (which are swept horizontally). This overlap can cause a UE to select the wrong SSB beam and/or frequently switch between SSB beams. To help prevent problems with SSB beam selection and/or beam switching, when the access node turns off transmission by one or more columns, the access node reduces the number of SSB beams that are transmitted thereby reducing the overlap of the (now) wider SSB beams.

Figure 1:
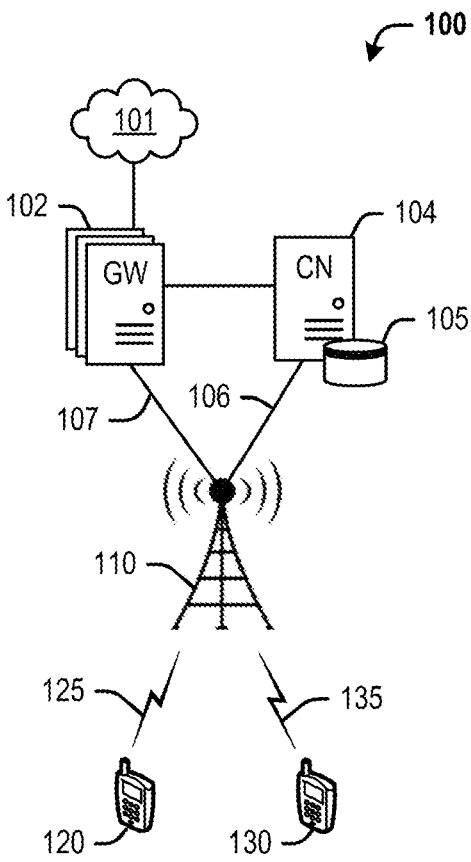
FIG. 1 depicts an exemplary system for wireless communication, in accordance with the disclosed examples.

FIG. 1 depicts an exemplary system for wireless communication with reduced interference while in power saving mode. System 100 comprises a communication network 101, gateway node 102, controller node 104, access node 110, and wireless devices 120 and 130. Access node 110 may include an access node of any type, including macrocell access nodes such as Long-Term-Evolution (LTE) eNodeBs or 5G New Radio (NR) gNodeBs, mini access nodes, home eNodeBs or gNodeBs, etc., and may include a plurality of antennas arranged in one or more arrays, wherein each antenna array is configured to steer or form one or more beams to wireless devices attached thereto, including wireless devices 120, 130. Access node 110 communicates with wireless devices 120, 130 over corresponding wireless communication links 125, 135, which can include direct communication links, formed beams, multiple-input-multiple-output (MIMO), and so on.

As described herein, a processing node communicatively coupled to any network node within system 100 (such as, for example, access node 110 or controller node 104) can be configured to enter a power saving mode. This power saving mode may reduce the number of rows of antenna being used to form the beams being transmitted to wireless device 120 and wireless device 130. To help prevent overshoot, when access node 110 turns off transmission by one or more rows of antenna, access node 110 also increases the electrical down tilt of the beam (i.e., angle of depression) to help contain the beams transmitted to wireless device 120 and wireless device 130 within an intended area of coverage.

Access node 110 may also measure the timing advance values used by wireless device 120 and wireless device 130. When a timing advance value for either wireless device 120 or wireless device 130 exceeds a configured threshold, access node 110 further increases the angle of depression of the beams transmitted by access node 110 (e.g., transmitted to wireless device 120 and/or wireless device 130). Increasing the angle of depression of the beams transmitted by access node 110 helps to ensure those beams are substantially confined to an intended coverage area for access node 110 and thereby do not interfere with neighboring access nodes (not shown in FIG. 1).

Access node 110 may be configured to use a power saving mode that reduces the number of columns of antenna being used to form the beams being transmitted to wireless device 120 and wireless device 130. This can cause system synchronization block (SSB) beam transmissions (which are swept horizontally) to overshoot into horizontally neighboring sectors and/or have increased horizontal overlap with other beams transmission of the sweep. To help prevent problems with wireless device 120 and/or wireless device 130 beam selection and/or beam switching, when access node 110 turns off transmission by one or more columns while in the power saving mode, access node 110 reduces the number of SSB beams in the sweep of SSB beams over the angle of the sector that are transmitted. Reducing the number of SSB beams in the sweep reduces the overlap of the (in power saving mode) wider SSB beams.

Access node 110 can be any network node configured to provide communication between wireless devices 120, 130 and communication network 101, including standard access nodes and/or short range, low power, small access nodes. For instance, access node 110 may include any standard access node, such as a macrocell access node, base transceiver station, a radio base station, next generation or gigabit NodeBs (gNBs) in 5G networks, or enhanced eNodeBs (eNBs) in 4G/LTE networks, or the like. In an example, a macrocell access node can have a coverage area in the range of approximately five kilometers to thirty five kilometers and an output power in the tens of watts. In other examples, access node 110 can be a small access node including a microcell access node, a picocell access node, a femtocell access node, or the like such as a home NodeB or a home eNodeB device. Moreover, it is noted that while access node 110 and wireless devices 120, 130 are illustrated in FIG. 1, any number of access nodes and wireless devices can be implemented within system 100.

Access node 110 can comprise processors and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicate with gateway node 102 and controller node 104 via communication links 106, 107. Access node 110 may communicate with other access nodes (not shown) using a direct link such as an X2 link or similar.

Wireless devices 120, 130 may be any device, system, combination of devices, or other such communication platform capable of communicating wirelessly with access node 110 using one or more frequency bands deployed therefrom. Wireless devices 120, 130 may be, for example, a mobile phone, a wireless phone, a wireless modem, a personal digital assistant (PDA), a voice over internet protocol (VOIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 130. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path-including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format-including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an example, controller node 104 includes a database 105 for storing information, such as mMIMO capabilities and historical signal conditions for wireless devices attached to access node 110, default mMIMO configurations and/or power saving mode configurations (i.e., which antenna rows and/or columns are disabled) for sectors deployed by access node 110, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between access node 110 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
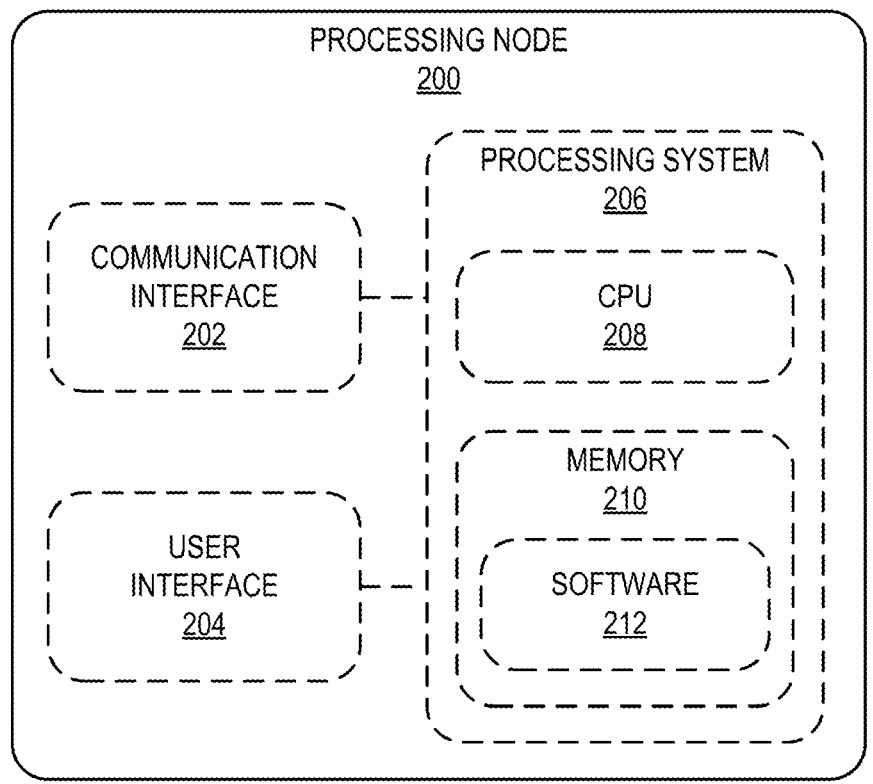
FIG. 2 depicts an exemplary processing node in accordance with disclosed examples.

FIG. 2 depicts an exemplary processing node 200 for reducing interference when in a power saving mode. Processing node comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store software 212, which may be executed to perform the operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an example, software 212 includes instructions that enable processing node 200 to perform operations including placing an access node in a power saving mode by disabling one or more rows of a mMIMO array or disabling one or more columns of a mMIMO array from transmitting, wherein the access node is configured to steer one or more formed beams towards the one or more wireless devices. When the access node disables one or more rows of the mMIMO array, the instructions increase the electrical down tilt of the beam (i.e., angle of depression) to help contain the beams transmitted by the access node within an intended area of coverage.

The instructions may also have the access node measure the timing advance values used by one or more wireless device communicating with the access node. When a timing advance value exceeds a configured threshold, the instructions further increase the angle of depression of the beams transmitted by the access node. Increasing the angle of depression of the beams transmitted by the access node helps to ensure those beams are substantially confined to an intended coverage area for the access node 110 and thereby reducing interference with neighboring access nodes.

When the access node disables one or more columns of the mMIMO array, the instructions reduce the number of SSB beams in the sweep of SSB beams over the angle of the sector that are transmitted. Reducing the number of SSB beams in the sweep helps reduces the overlap of the (in power saving mode) wider SSB beams caused by the reduction in the number of columns of mMIMO antenna in the array while the access node is in the power saving mode.

Figure 3A:
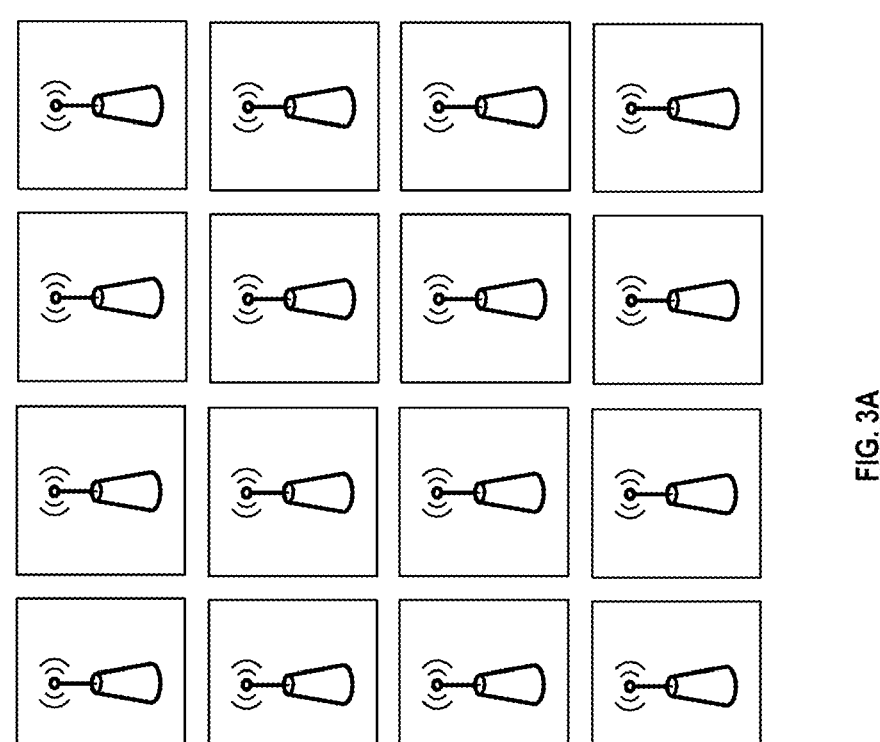
FIGS. 3A-3C are notional diagrams illustrating a mMIMO power saving modes in accordance with one disclosed example.
Figure 3B:
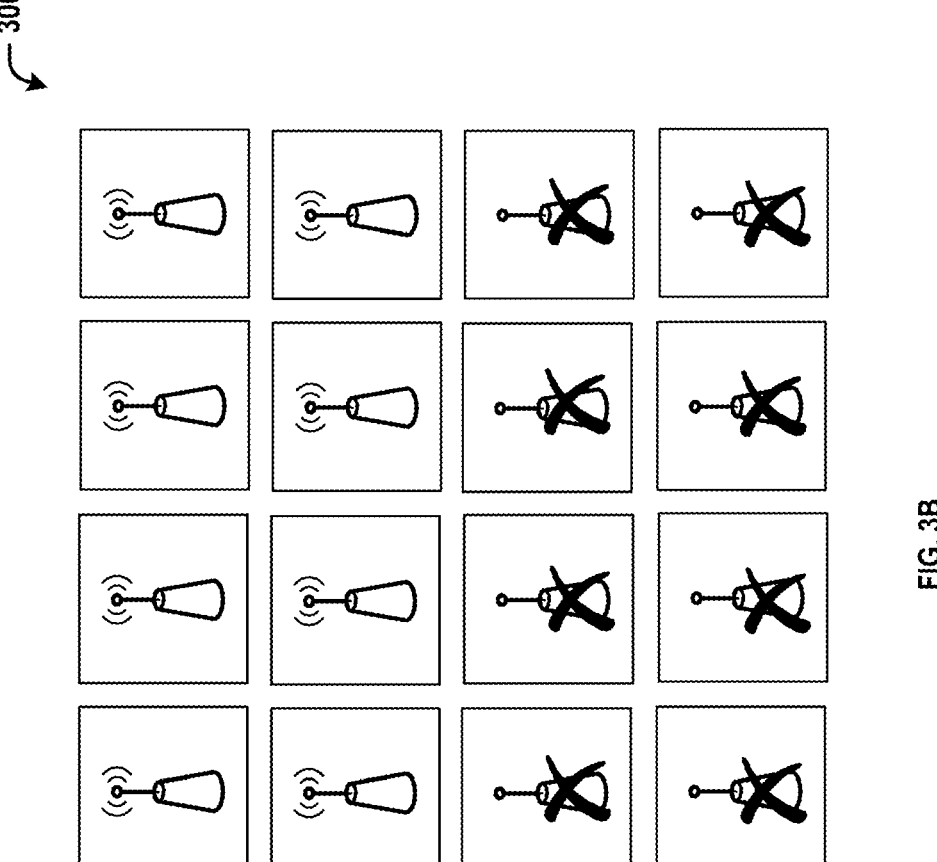
Figure 3C:
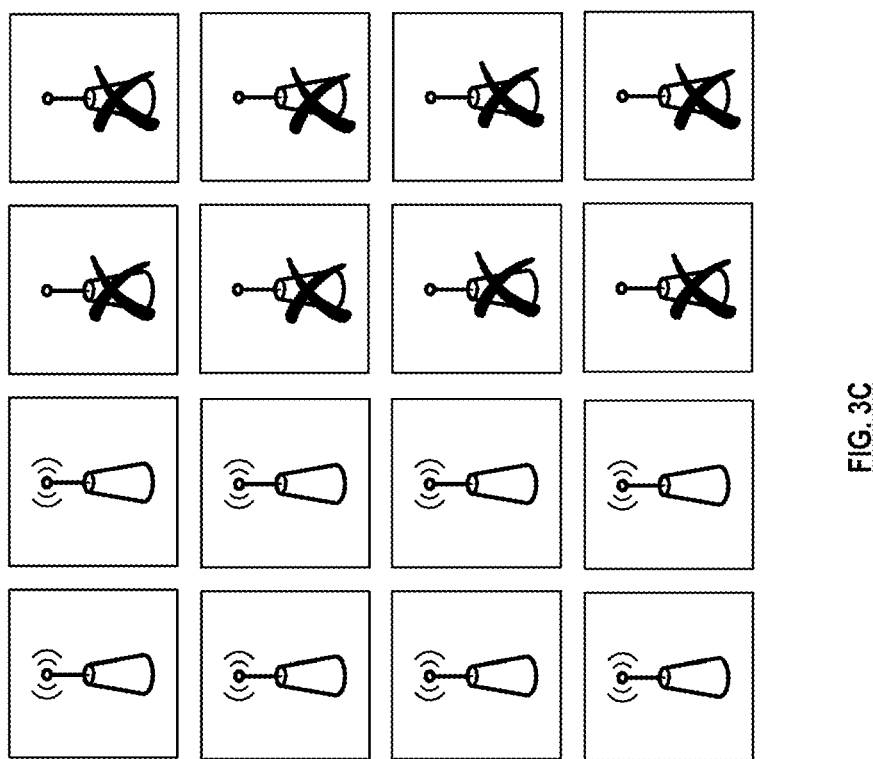

FIGS. 3A-3C are notional diagrams 300 illustrating a mMIMO power saving modes in accordance with one disclosed example. In FIG. 3A, a normal (i.e., non-power saving mode) mMIMO configuration is illustrated. In FIG. 3A, mMIMO array 300 comprises a 4×4 array of antenna each of which is enabled and transmitting. This is illustrated in FIG. 3A by the antenna each being illustrated with a radiation pattern emanating from the antenna symbol.

In FIG. 3B, a power saving mode mMIMO array configuration that disables one or more rows of antennas is illustrated. In FIG. 3B, mMIMO array 300 has the lower two rows of antennas disabled. This is illustrated in FIG. 3B by the "X" over each of the antenna symbols in the bottom two rows and the lack of a radiation pattern emanating from the antenna symbols in the bottom two rows.

In FIG. 3C, a power saving mode mMIMO array configuration that disables one or more rows of antennas is illustrated. In FIG. 3C, mMIMO array 300 has the rightmost two columns of antennas disabled. This is illustrated in FIG. 3C by the "X" over each of the antenna symbols in the rightmost two columns and the lack of a radiation pattern emanating from the antenna symbols in the rightmost two columns.

Figure 4A:
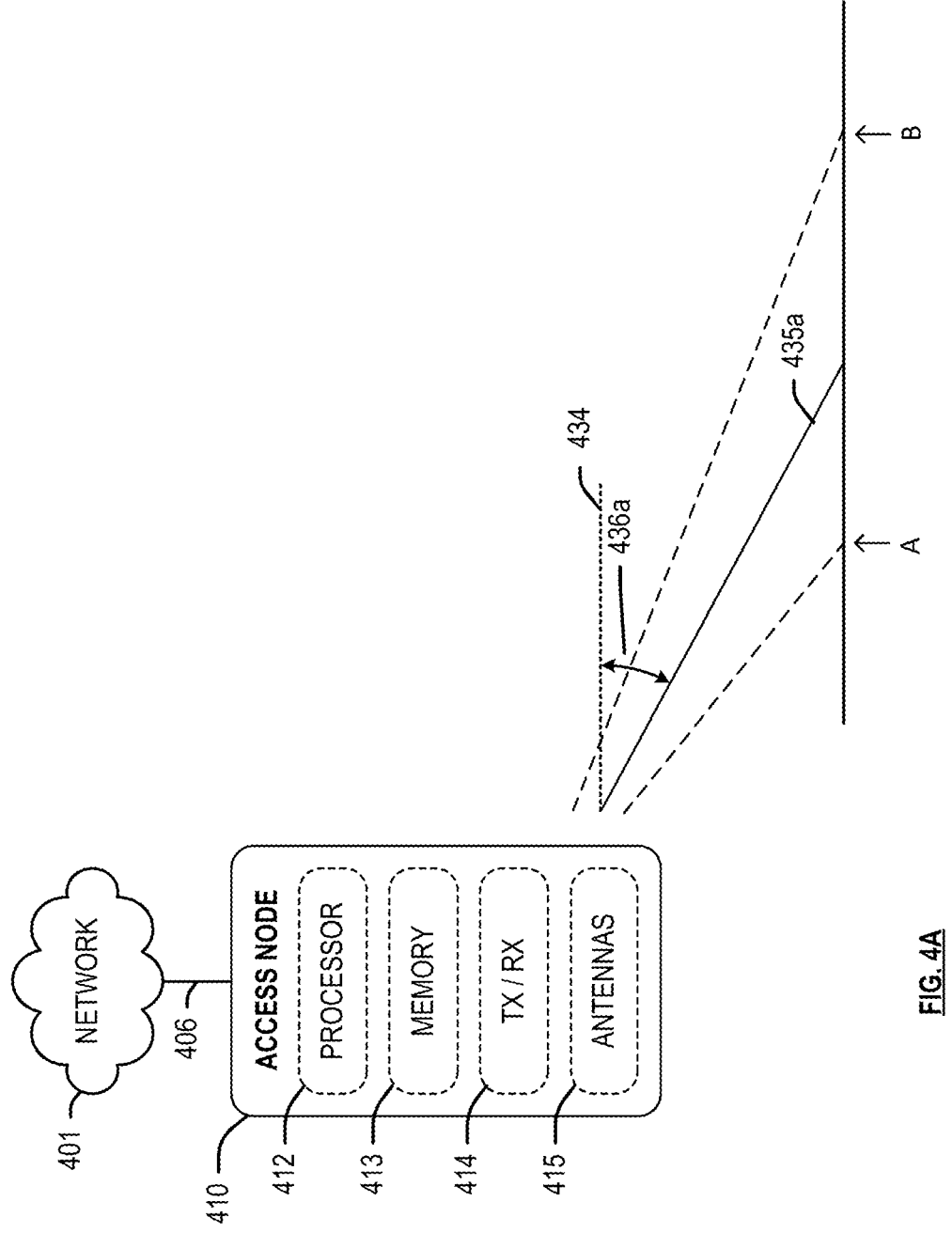
FIGS. 4A-4B illustrate a mMIMO power saving mode interference reduction in accordance with a disclosed example.
Figure 4B:
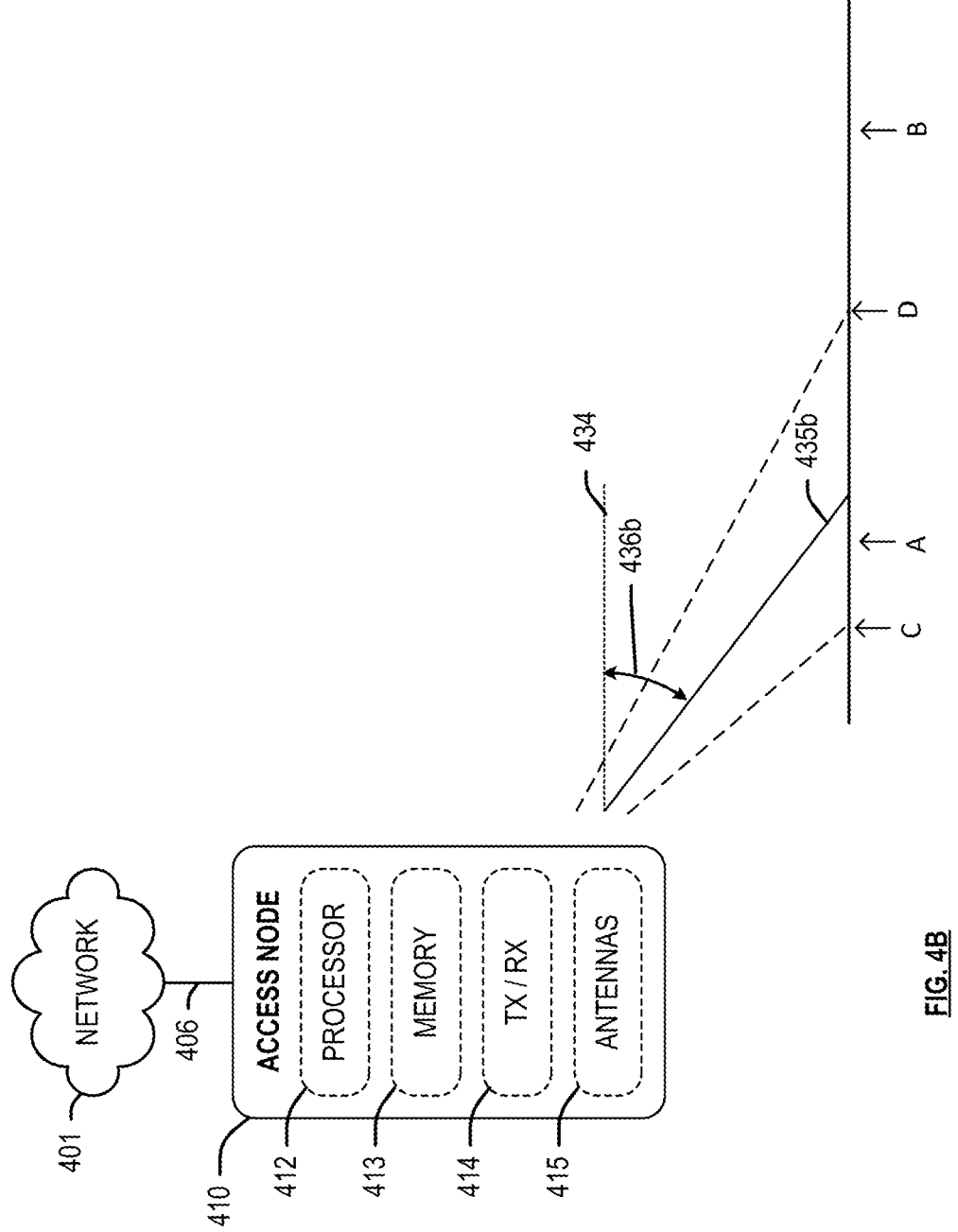

FIGS. 4A-4B depicts an exemplary access node 410 with mMIMO power saving mode interference reduction. Access node 410 may be configured as an access point for providing network services from network 401 to end-user wireless devices via a radio-air interface deployed therefrom. Access node 410 is illustrated as comprising a processor 412, a memory 413 (for storing instructions that are performed by processor 412), a transceiver 414, and antennas 415 for deploying a radio air interface over wireless sectors. One pair of transceivers and antennas are illustrated herein solely to simplify the written description, and it may be evident to those having ordinary skill in the art, that any combination of transceivers and antennas may be incorporated in order to deploy different sectors that are configured to utilize mMIMO, which includes formed beams, MU-MIMO data streams, and/or to facilitate communication with other network nodes on network 401. Further, access node 410 is communicatively coupled to network 401 via communication interface 406, which may be any wired or wireless link as described above.

In FIG. 4A, access node 410 is illustrated operating in a normal (i.e., non-power saving mode-see e.g., FIG. 3A). In FIG. 4A, dotted line 434 represents horizontal and line 435a represents the center of the beam being transmitted by antennas 415. Thus, arc arrow line 436a, which runs from horizontal line 434 to line 435a represents the angle of depression of the beam being transmitted by antennas 415. Point "A" and point "B" in FIG. 4A illustrate the extent of the beam coverage with the angle of depression of the beam transmitted by antennas 415 illustrated by arc arrow line 436a along the radial direction from antennas 415.

In FIG. 4B, access node 410 is illustrated operating in a power saving mode where horizontal rows of antennas 415 have been disabled from transmitting (see, e.g., FIG. 3B). In FIG. 4B, dotted line 434 represents horizontal and line 435b represents the center of the beam being transmitted by antennas 415. Arc arrow line 436b, which runs from horizontal line 434 to line 435b represents the angle of depression of the beam being transmitted by antennas 415. Note that the angle of depression represented by arc arrow line 436b is greater than the angle of depression represented in FIG. 4A by arc arrow line 436a. Point "C" and point "D" in FIG. 4B illustrate the extent of the beam coverage with the angle of depression of the beam transmitted by antennas 415 illustrated by arc arrow line 436b along the radial direction from antennas 415. Note that point "D" is closer to access node 406 than point "B". This illustrates that increasing the angle of depression of the beam transmitted by antennas 415 while in a power saving mode helps reduce the range of the beam thus helping to prevent the beam from to overshooting (i.e., going beyond) the intended area of coverage for access node 410 and increasing interference with a neighboring access node.

Figure 5A:
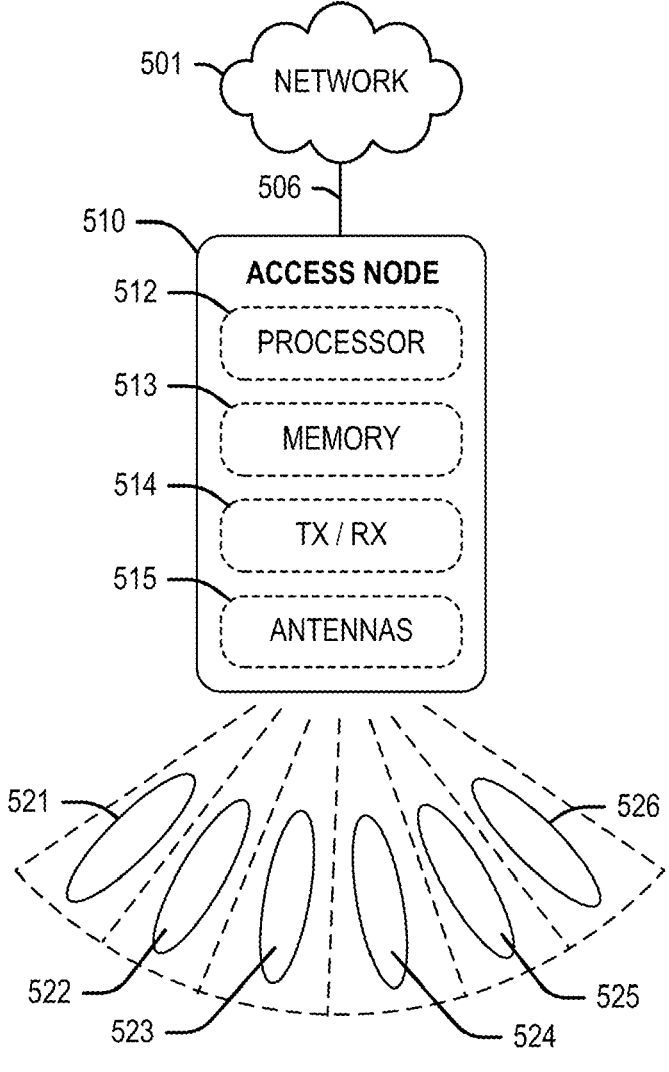
FIGS. 5A-5B illustrate a mMIMO power saving mode interference reduction in accordance with another disclosed example.
Figure 5B:
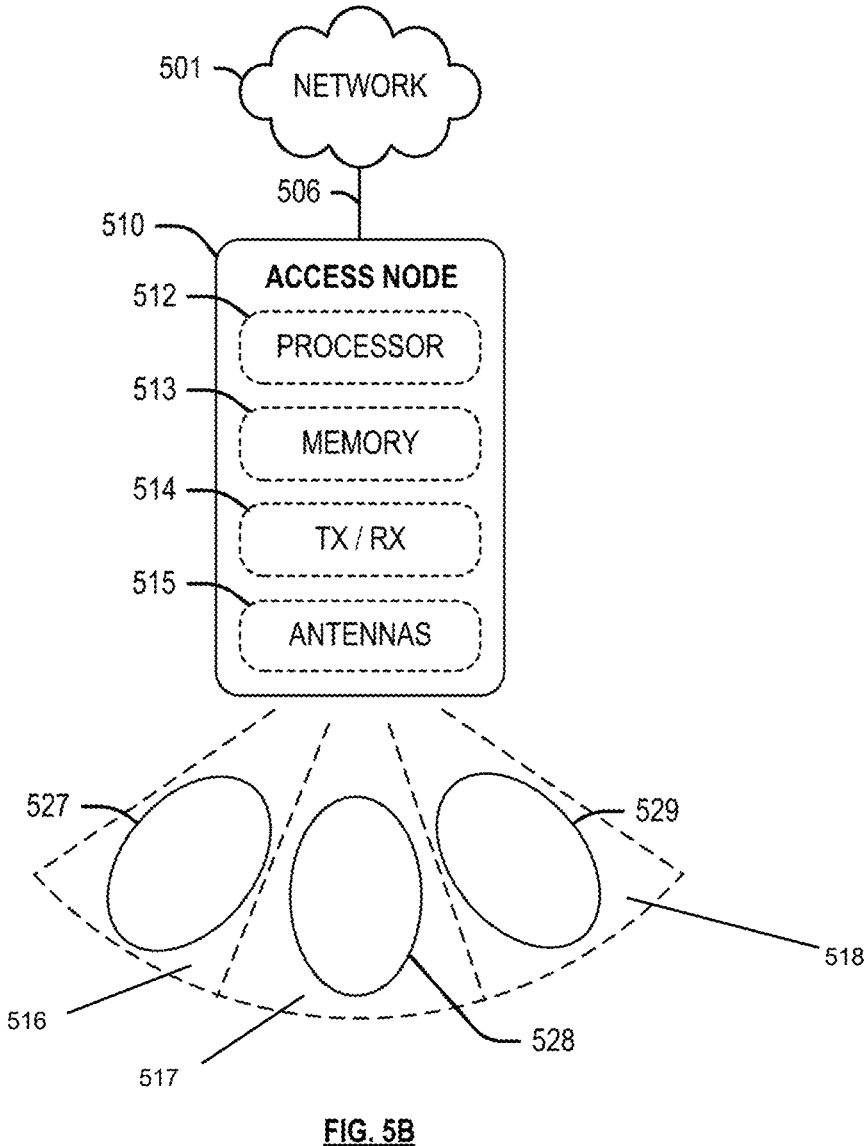

FIGS. 5A-5B illustrate an exemplary access node 510 with mMIMO power saving mode interference reduction. Access node 510 may be configured as an access point for providing network services from network 501 to end-user wireless devices via a radio-air interface deployed therefrom. Access node 510 is illustrated as comprising a processor 512, a memory 513 (for storing instructions that are performed by processor 512), a transceiver 514, and antennas 515 for deploying a radio air interface over wireless sectors 516, 517, and 518. One pair of transceivers and antennas are illustrated herein solely to simplify the written description, and it may be evident to those having ordinary skill in the art, that any combination of transceivers and antennas may be incorporated in order to deploy different sectors that are configured to utilize mMIMO, which includes formed beams, MU-MIMO data streams, and/or to facilitate communication with other network nodes on network 501. Further, access node 510 is communicatively coupled to network 501 via communication interface 506, which may be any wired or wireless link as described above.

In FIG. 5A, access node 510 is illustrated operating in a normal (i.e., non-power saving mode-see e.g., FIG. 3A). In FIG. 5A, top-view notional beam patterns 521-526 represent coverage areas for the beams being transmitted by antennas 415 during an SSB scan using six azimuth angles (and SSB transmissions) over the sector intended to be covered by access node 510.

In FIG. 5B, access node 510 is illustrated operating in a power saving mode where vertical columns of antennas 515 have been disabled from transmitting (see, e.g., FIG. 3C). In FIG. 5B, top-view notional beam patterns 527-529 represent coverage areas for the beams being transmitted by antennas 515 during an SSB scan using three azimuth angles (and SSB transmissions) over the sector intended to be covered by access node 510. Note that, because one or more vertical columns of antennas 515 have been disable from transmitting, the notional beam patterns 527-529 shown in FIG. 5B are illustrated as being wider (in the azimuth direction) than the notional beam patterns 521-526 shown in FIG. 5A. Thus, because notional beam patterns 527-529 are wider, when access node 510 is in a power saving mode where vertical columns of antennas 515 have been disabled from transmitting, fewer (e.g., three vs. six) beams are transmitted by antennas 415 during an SSB scan in order to cover the sector intended to be covered by access node 510.

FIG. 6 is a flowchart illustrating a method for reducing interference while in a power saving mode. The steps illustrated in FIG. 6 may be performed, for example, by one or more elements of communication system 100. A first synchronization signal block is transmitted, by an access node using a massive multiple-input multiple-output antenna array comprising a first plurality of antennas and a second plurality of antennas, at a first beam angle of depression from horizontal (602). For example, access node 110 may transmit, while in a normal operating mode, an SSB using a massive multiple-input multiple-output antenna array configured to form a beam at a first angle of depression. In another example, when in a normal operating mode, access node 410 may be configured to transmit an SSB using all antennas 415 at an angle of depression illustrated by arc arrow line 436a.

The second plurality of antennas are disabled from transmitting a second synchronization signal block (604). For example, access node 110 may enter a power saving mode by disabling one or more rows of the massive multiple-input multiple-output antenna array from transmitting. In another example, access node 410 may enter a power saving mode by disabling one or more horizontal rows of antennas 415 from transmitting.

By the access node and using the first plurality of antennas and not using the second plurality of antennas, the second synchronization signal block is transmitted at a second beam angle of depression from horizontal where the second beam angle of depression is grated than the first beam angle of depression (606). For example, access node 110 may transmit, while in a power saving mode, an SSB using a massive multiple-input multiple-output antenna array configured to form a beam at a second angle of depression that is greater than the angle of depression used when access node 110 was in a normal operating mode. In another example, when in a power saving operating mode, access node 410 may be configured to transmit an SSB using less than all the rows of antennas 415 at an angle of depression illustrated by arc arrow line 436b.

FIG. 7 is a flowchart illustrating a method for reducing interference. The steps illustrated in FIG. 7 may be performed, for example, by one or more elements of communication system 100. By an access node using a massive multiple-input multiple-output antenna array comprising a first plurality of antennas and a second plurality of antennas, a first plurality of synchronization signal blocks are transmitted in a first frame, where there are a first integer number, greater than one, of synchronization signal blocks in the first plurality of synchronization signal blocks, the first plurality of synchronization signal blocks each being transmitted in the first frame by the massive multiple-input multiple-output antenna array at different azimuth angles (702). For example, access node 110, when in a normal operating mode, may transmit, in a frame, a plurality of SSBs beamformed at varying azimuth angles in order to sweep the SSBs over the angle of the sector. In another example, access node 510, when in a normal operating mode, may transmit, in a frame and using all of antennas 515, an integer number, greater than one, of SSBs beams (illustrated as notional beam patterns 521-526) at varying azimuth angles in order to sweep the SSB transmission over the angle of the sector.

The second plurality of antennas are disabled from transmitting a second synchronization signal block in a second frame (704). For example, access node 110 may enter a power saving mode by disabling one or more rows of the massive multiple-input multiple-output antenna array from transmitting. In another example, access node 510 may enter a power saving mode by disabling one or more vertical columns of antennas 415 from transmitting.

By the access node and using the first plurality of antennas and not using the second plurality of antennas, a second plurality of synchronization signal blocks are transmitted in a second frame where there are a second integer number, grater than one, of synchronization signal blocks in the second plurality of synchronization signal blocks, the second plurality of synchronization signal blocks each being transmitted in the second frame by the first plurality of antennas at different azimuth angles, where the first integer number is greater than the second integer number (706). For example, access node 110, when in a power saving operating mode, may transmit, in another frame, a reduced number of SSBs beamformed at varying azimuth angles in order to sweep the SSBs over the angle of the sector. In another example, access node 510, when in a power saving operating mode, may transmit, in another frame and using less than all of the columns of antennas 515, a reduced number of SSB beams (illustrated as notional beam patterns 527-529) at varying azimuth angles in order to sweep the SSB transmission over the angle of the sector.

FIG. 8 is a flowchart illustrating a method for changing power modes. The steps illustrated in FIG. 8 may be performed, for example, by one or more elements of communication system 100. By an access node having a massive multiple-input multiple-output antenna array comprising a first plurality of antennas and a second plurality of antennas, the first plurality of antennas to transmit a first synchronization signal block (802). For example, access node 110 may select a first subset of rows of antennas to be enabled to transmit while in a power saving mode.

By the access node and using the first plurality of antennas and not the second plurality of antennas, the first synchronization signal block is transmitted at a first beam angle of depression from horizontal (804). For example, while in the power saving mode and using the first subset of rows of antennas but not the remaining antennas, access node 110 may transmit a first synchronization signal block at a first beam angle of depression (e.g., line 436b) from horizontal.

By the access node, the first plurality of antennas and the second plurality of antennas are selected to transmit a second synchronization signal block (806). For example, access node 110 may select all of the rows of antennas of its mMIMO array to be enabled to transmit while in a normal operating (non-power saving) mode.

By the access node and using the first plurality of antennas and the second plurality of antennas, the second synchronization signal block is transmitted at a second beam angle of depression from horizontal that is less than first beam angle of depression from horizontal (808). For example, while in the normal operating mode and using all of the rows of antennas in its mMIMO array, access node 110 may transmit a second synchronization signal block at a second beam angle of depression (e.g., line 436a) from horizontal that is less than the first beam angle of depression from horizontal.

In some examples, methods illustrated in FIGS. 6, 7, and/or 8 may include additional steps or operations. Furthermore, the methods may include steps shown in each of the other methods. As one of ordinary skill in the art would understand, the methods illustrated in FIGS. 6, 7, and/or 8 may be integrated in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific examples described above, but only by the following claims and their equivalents.

What is claimed is:

1. A method of reducing interference, comprising:
transmitting, by an access node using a massive multiple-input multiple-output antenna array comprising a first plurality of antennas and a second plurality of antennas, a first synchronization signal block, the first synchronization signal block being transmitted by the massive multiple-input multiple-output antenna array at a first beam angle of depression from horizontal;
disabling the second plurality of antennas from transmitting a second synchronization signal block; and
transmitting, by the access node using the first plurality of antennas and not using the second plurality of antennas, the second synchronization signal block at a second beam angle of depression from horizontal, the second beam angle of depression being greater than the first beam angle of depression.

2. The method of claim 1, wherein a difference between the first beam angle of depression and the second beam angle of depression is preconfigured.

3. The method of claim 1, further comprising:
configuring a first wireless device with a first timing advance value.

4. The method of claim 3, further comprising:
based on the first timing advance value meeting a threshold criteria, transmitting, by the access node using the first plurality of antennas and not using the second plurality of antennas, a third synchronization signal block at a third beam angle of depression from horizontal, the third beam angle of depression being greater than the second beam angle of depression.

5. The method of claim 1, wherein the first plurality of antennas are arranged horizontal rows.

6. The method of claim 5, wherein the second plurality of antennas are arranged in horizontal rows.

7. The method of claim 1, further comprising:
enabling the second plurality of antennas to transmit a third synchronization signal block; and
transmitting, by the access node using the first plurality of antennas and the second plurality of antennas, the third synchronization signal block at the first beam angle of depression from horizontal.

8. A method of reducing interference, comprising:
transmitting, by an access node using a massive multiple-input multiple-output antenna array comprising a first plurality of antennas and a second plurality of antennas, a first plurality of synchronization signal blocks in a first frame where there are a first integer number, greater than one, of synchronization signal blocks in the first plurality of synchronization signal blocks, the first plurality of synchronization signal blocks each being transmitted in the first frame by the massive multiple-input multiple-output antenna array at different azimuth angles;

disabling the second plurality of antennas from transmitting a second plurality of synchronization signal blocks in a second frame; and transmitting, by the access node using the first plurality of antennas and not using the second plurality of antennas, a second plurality of synchronization signal blocks in a second frame where there are a second integer number, greater than one, of synchronization signal blocks in the second plurality of synchronization signal blocks, the second plurality of synchronization signal blocks each being transmitted in the second frame by the first plurality of antennas at different azimuth angles, the first integer number being greater than the second integer number.

9. The method of claim 8, wherein the first plurality of synchronization signal blocks are transmitted with narrower azimuth angles between adjacent ones of the first plurality of synchronization signal blocks than azimuth angles between adjacent ones of the second plurality of synchronization signal blocks.

10. The method of claim 8, wherein the first plurality of antennas are arranged vertical columns.

11. The method of claim 10, wherein the second plurality of antennas are arranged in vertical columns.

12. The method of claim 11, further comprising:

enabling the second plurality of antennas to transmit a third plurality of synchronization signal blocks in a third frame.

13. The method of claim 12, further comprising:

transmitting, by the access node using the first plurality of antennas and the second plurality of antennas, the third plurality of synchronization signal blocks in the third frame where there are the first integer number of synchronization signal blocks in the third plurality of synchronization signal blocks.

14. The method of claim 13, wherein the third plurality of synchronization signal blocks are each transmitted in the third frame at azimuth angles that correspond to the different azimuth angles that the first plurality of synchronization signal blocks were transmitted in the first frame.

15. A method of operating a communication system, comprising:

selecting, by an access node having a massive multiple-input multiple-output antenna array comprising a first plurality of antennas and a second plurality of antennas, the first plurality of antennas to transmit a first synchronization signal block;

transmitting, by the access node using the first plurality of antennas and not the second plurality of antennas, the first synchronization signal block at a first beam angle of depression from horizontal;

selecting, by the access node, the first plurality of antennas and the second plurality of antennas to transmit a second synchronization signal block; and transmitting, by the access node using the first plurality of antennas and the second plurality of antennas, the second synchronization signal block at a second beam angle of depression from horizontal, where the second beam angle of depression from horizontal is less than the first beam angle of depression from horizontal.

16. The method of claim 15, wherein a difference between the first beam angle of depression and the second beam angle of depression is preconfigured.

17. The method of claim 15, further comprising:

configuring a first wireless device with a first timing advance value.

18. The method of claim 17, further comprising:

based on the first timing advance value meeting a threshold criteria, transmitting, by the access node using the first plurality of antennas and not using the second plurality of antennas, a third synchronization signal block at a third beam angle of depression from horizontal, the third beam angle of depression being greater than the first beam angle of depression.

19. The method of claim 18, wherein the first plurality of antennas are arranged in a first at least one horizontal row.

20. The method of claim 19, wherein the second plurality of antennas are arranged in a second at least one horizontal row.

* * * * *